United States Patent
Sharma et al.

(10) Patent No.: US 7,640,326 B2
(45) Date of Patent: Dec. 29, 2009

(54) RELAYING OF MESSAGE WAITING INDICATIONS TO SUPPORT DISTRIBUTED TELEPHONY NETWORKS

(75) Inventors: Anil Sharma, Milpitas, CA (US); Michael E. Tasker, Pleasanton, CA (US); Kishore Inampudi, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 753 days.

(21) Appl. No.: 10/116,621

(22) Filed: Apr. 3, 2002

(65) Prior Publication Data
US 2005/0278436 A1    Dec. 15, 2005

(51) Int. Cl.
*G06F 15/173* (2006.01)
(52) U.S. Cl. .................. 709/223; 709/246; 379/88.12; 379/67; 179/18 B
(58) Field of Classification Search .......... 709/223, 709/246; 379/88.12, 67; 179/18 B
See application file for complete search history.

(56) References Cited

U.S. PATENT DOCUMENTS

| 4,476,349 | A |  | 10/1984 | Cottrell et al. ............ 179/18 B |
| 5,475,737 | A |  | 12/1995 | Garner et al. .................. 379/67 |
| 5,579,472 | A |  | 11/1996 | Keyworth, II et al. ....... 395/326 |
| 6,317,485 | B1 |  | 11/2001 | Homan et al. ................. 379/88 |
| 6,389,276 | B1 |  | 5/2002 | Brilla et al. .................. 455/413 |
| 6,434,143 | B1 | * | 8/2002 | Donovan ..................... 370/356 |
| 6,446,114 | B1 |  | 9/2002 | Bulfer et al. ................ 709/206 |
| 6,529,500 | B1 |  | 3/2003 | Pandharipande ............ 370/352 |
| 6,560,318 | B1 | * | 5/2003 | Spielman et al. ......... 379/88.12 |
| 6,647,109 | B1 | * | 11/2003 | Henderson .................. 379/219 |
| 6,665,378 | B1 | * | 12/2003 | Spielman et al. ......... 379/88.12 |
| 6,842,506 | B1 | * | 1/2005 | Bedingfield ............. 379/88.12 |

FOREIGN PATENT DOCUMENTS

EP    0 367 455 A2    10/1989
WO    WO 00/39993    7/2000

OTHER PUBLICATIONS

PCT Notification of Transmittal of the International Search Report or the Declaration mailed Mar. 30, 2003, re PCT/US 03/09509 filed Mar. 27, 2003 (7 pages).
Canadian Intellectual Property Office letter to Gowling LaFleur Henderson LLP regarding Office Action for Canadian Patent Application No. 2,479,934 dated Oct. 16, 2008, forwarded by foreign associate to Baker Botts on Jan. 7, 2009, 3 pages.

* cited by examiner

*Primary Examiner*—Tonia L Dollinger
*Assistant Examiner*—Kyung H Shin
(74) *Attorney, Agent, or Firm*—Baker Botts L.L.P.

(57) ABSTRACT

In a telephony system have management of telephony devices distributed among multiple call management devices, the call management devices use call redirection and relaying of message waiting indications to provide voicemail services to the telephony devices using a centralized voicemail server.

21 Claims, 2 Drawing Sheets

RELAYING OF MESSAGE WAITING INDICATIONS TO SUPPORT DISTRIBUTED TELEPHONY NETWORKS

TECHNICAL FIELD OF THE INVENTION

The present invention relates generally to telephony networks and, more specifically, to relaying of message waiting indications to support distributed telephony networks.

BACKGROUND OF THE INVENTION

In traditional telephony networks, organizations often provide telephone services using a public branch exchange (PBX) configured to support multiple telephone extensions. Usually, a voicemail system attached to the PBX provides voicemail services for extensions serviced by the PBX. For example, if a serviced telephone extension fails to answer a call, the PBX will forward the call to the voicemail system. The voicemail system, upon receiving a message for one of the extensions, will inform the PBX, which in turn informs the extension to provide a message waiting indication, such as a blinking light.

SUMMARY OF THE INVENTION

In accordance with the present invention, techniques for relaying message waiting indications to support distributed telephony networks are provided that substantially eliminate or reduce disadvantages or problems associated with previous techniques.

According to a particular embodiment, a method for supporting centralized voicemail services in a distributed telephony system receives a message waiting indication from a voicemail server, with the message waiting indication identifying a telephony device. The method determines whether the telephony device is locally managed and, if not locally managed, determines a call management device managing the telephony device and relays the message waiting indication to the call management device.

Embodiments of the invention provide various technical advantages. The disclosed techniques allow for the distribution of telephony services while maintaining compatibility with legacy voicemail systems and voicemail systems with limited support for distributed management of telephony devices. This permits upgrades to implement advanced telephony systems, such as Internet Protocol (IP) telephony equipment, without requiring wholesale replacement of all existing telephony systems. For example, an organization using a traditional voicemail system may wish to upgrade its phone system to a distributed, IP-based telephony system. Using the disclosed techniques, the organization need not replace the existing voicemail server. Thus, the disclosed techniques potentially provide cost and efficiency benefits within telephony networks.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
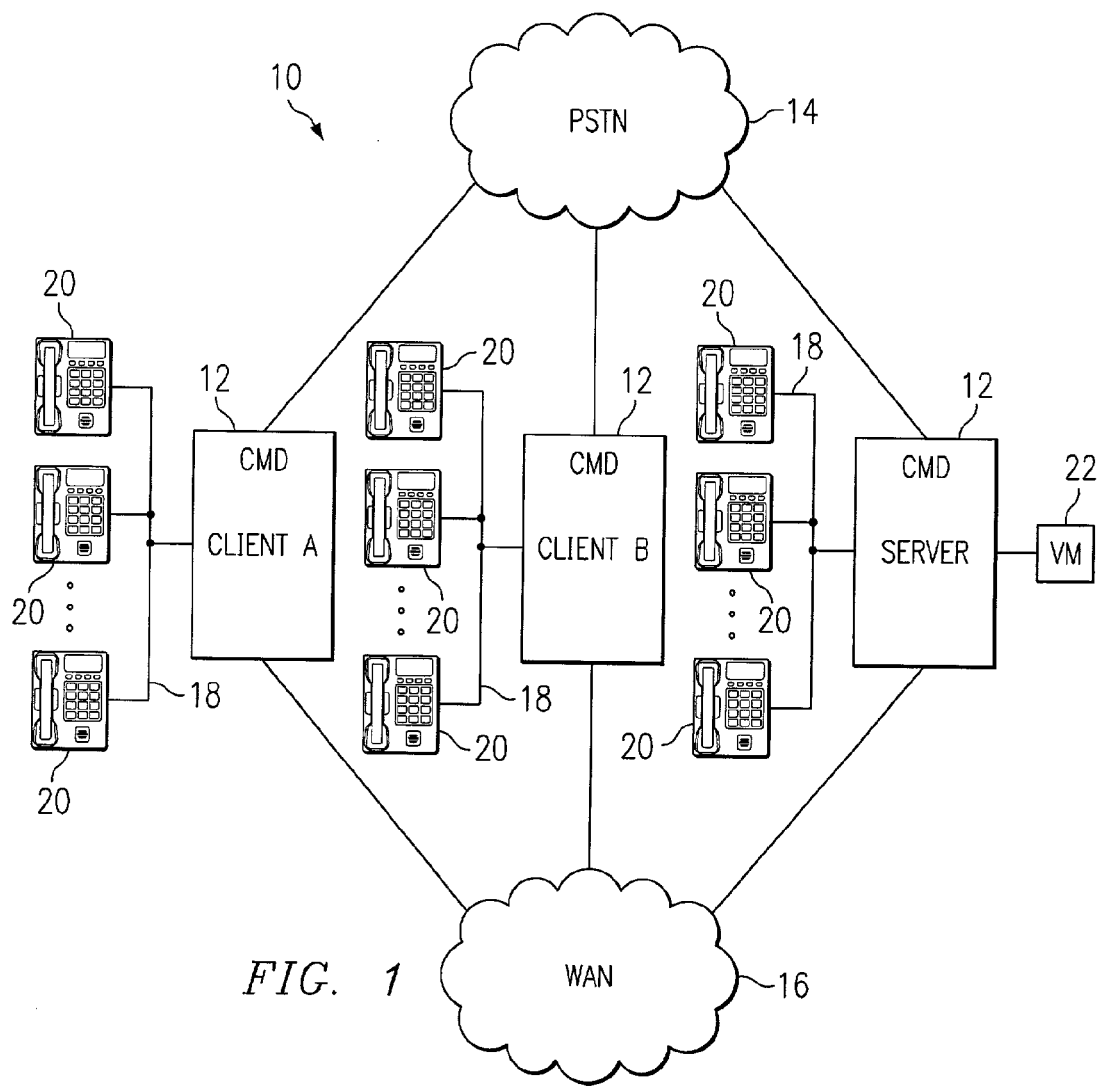
FIG. 1 illustrates a telephony communication system having call management devices that support relaying of message waiting indications in accordance with various embodiments of the present invention.

FIG. 1 illustrates a telecommunication system, indicated generally at 10, that includes call management devices 12 that each link to public switched telephone network (PSTN) 14, a wide area network (WAN) 16, and a local area network (LAN) 18 to provide telephony services for telephony devices 20. In addition, one of call management devices 12 links to a voicemail server 22, which provides centralized voicemail services for telephony devices 20 managed by call management devices 12. In general, call management devices 12 support redirection of telephone calls and relaying of message waiting indications to provide voicemail services in a distributed telephony environment using a centralized voicemail system.

PSTN 14 represents any part or parts of the collection of interconnected telephony systems operated by various telephone companies and administrators around the world. Wide area network 16 represents any suitable collection and arrangement of network elements providing connectivity between call management devices 12. For example, wide area network 16 may include switches, gateways, and other suitable equipment linking locations in one or more cities spread throughout the globe. According to particular embodiments, wide area network 16 supports packet-based communications, such as Internet protocol (IP) communications, between call management devices 12.

Call management devices 12 represent hardware, including any suitable controlling logic, operating to provide telephony services for telephony devices 20. In the embodiment illustrated, system 10 includes three call management devices 12, with one device 12 operating and labeled as a server and the remaining two devices 12 operating as clients and labeled as Client A and Client B. A particular example providing specific functional elements of call management device 12 is provided below with respect to FIG. 2.

Each call management device 12, whether operating as a client or a server, may couple to a particular LAN 18 to provide connectivity and management for one or more telephony devices 20. LANs 18 represent any suitable collection and arrangement of network equipment providing connectivity between a particular call management device 12 and its managed telephony devices 20. For example, LANs 18 may represent Ethernet networks transporting packets, such as IP packets.

Telephony devices 20 represent hardware, including any appropriate controlling logic, that provide telephone services to users. For example, telephony devices 20 may include IP telephones, suitably equipped personal computers, and/or other appropriate equipment. Moreover, while illustrated as linking to call management devices 12 using LAN 18, system 10 contemplates telephony devices 20 coupling to call management devices 12 and other appropriate networks using any suitable links, protocols, and techniques. For example, telephony devices 20 may include mobile units that link with call management devices 12 and other communications equipment using wireless communications protocols.

Voicemail server 22 represents hardware, including any appropriate controlling logic, that provides voicemail services for telephony devices 20. Voicemail server 22 uses any suitable technology and techniques to provide voicemail services. The particular route by which voicemail server 22 links with server device 12 may depend upon the actual type of equipment and controlling logic within voicemail server 22. Thus, while shown in this example as linking directly with server device 12, system 10 contemplates voicemail server 22 linking to server device 12 through local area network 18, wide area network 16, a specialized port within server device 12, and/or any other suitable link. However, due to the voicemail support provided by call management devices 12, voicemail server 22 need not have an awareness of or directly support voicemail services for a distributed telephony environment. That is, voicemail server 22 need not be aware of the management of telephony devices 20 by multiple call management devices 12.

Each call management device 12, whether acting as client or server, manages a group of local telephony devices 20. Among other management activities, this local management includes ringing extensions, handling ring-no-answer events, and signaling message waiting indications. To support centralized voicemail services through voicemail server 22, call management devices 12 use redirection of calls and relaying of message waiting indications.

However, for telephony devices 20 managed by server device 12, server device 12 need not use call redirection or relaying of message waiting indications. For example, consider an incoming call to one of telephony devices 20 locally managed by server device 12. If there is no answer, server device 12 may transfer the call directly to voicemail server 22. If the calling party leaves a message, voicemail server 22 will inform server device 12 that a message is now waiting for the called telephony device 20. In response, server device 12 can inform telephony device 20 to provide a message waiting indication, such as a flashing light-emitting diode (LED) or modified dial tone. Thus, for locally managed telephony devices 20, server device 12 provides voicemail services similarly to traditional systems.

For telephony devices 20 managed by client devices 12, system 10 uses relaying of message waiting indications and call redirection. For example, consider a call to telephony device 20 managed by Client A. After ringing telephony device 20 for an appropriate period of time, Client A may transfer the call to voicemail server 22. To effect this transfer, Client A redirects the telephone call to server device 12, which in turn directs the call to voicemail server 22. If the calling party leaves a message, voicemail server 22 will inform server device 12. Server device 12, upon identifying telephony device 20 as managed by Client A, will relay the message waiting indication to Client A. In response, Client A instructs telephony device 20 to provide a message waiting indication. Thus as shown in this example, call management devices 12 use call redirection and relaying of message waiting indications to provide voicemail services from a centralized voicemail server 22 for telephony devices 20 having distributed management.

To enable relaying of message waiting indications, client call management devices 12 register with server device 12. For example, each client device 12 may provide a list of managed telephony devices 20 to server device 12. Server device 12 may then use the information from various client devices 12 to appropriately relay message waiting indications. According to particular embodiments, call management devices 12 use session initiation protocol (SIP) messaging to handle registration and relaying of message waiting indications. For example, client devices 12 may use SIP subscription messages to register telephony devices 20 with server device 12. Server device 12, in turn, may use SIP notification messages to inform client devices 12 of message waiting indications for managed telephony devices 20. Similarly, devices 12 may use protocols such as H 450 for registrations and notifications. However, system 10 contemplates call management devices 12 using any suitable protocols and techniques for exchanging information on telephony devices 20 to enable the relaying of message waiting indications.

According to various embodiments, devices 12 may use cascaded registrations to further distribute support for centralized voicemail services. For example, client A may register its locally managed extensions with client B. In turn, client B, in addition to registering its own locally managed extensions, registers the extensions of client A with server 12. Given this example, server 12 could relay message waiting indications to client B, which in turn could relay these indications to client A.

Figure 2:
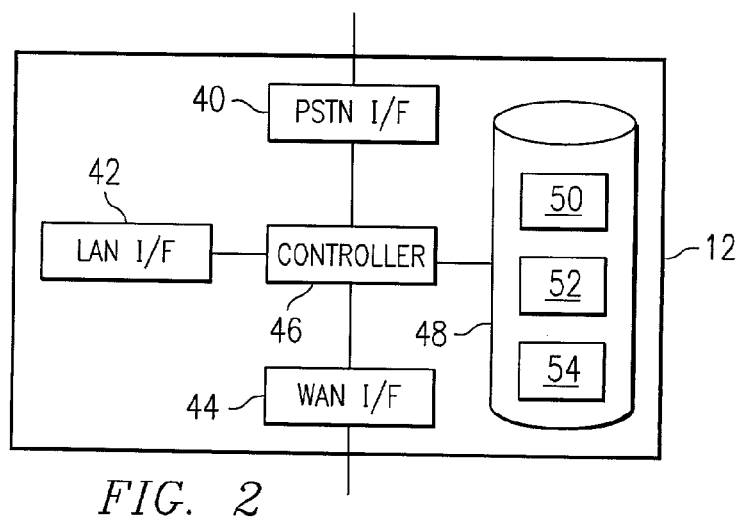
FIG. 2 is a block diagram illustrating exemplary functional components for a particular embodiment of a call management device of the system.

FIG. 2 is a block diagram illustrating exemplary functional components of call management device 12, which includes a PSTN interface 40, a LAN interface 42, and a WAN interface 44. In addition, call management device 12 includes a controller 46 and a memory 48 that maintains local management information 50, remote subscriber information 52, and server device information 54. (In the embodiment illustrated, memory 48 is a computer readable storage medium that maintains information for use by call management device 12 operating as a client and as a server.) In general, call management device 12 manages telephony services for a group of telephony devices 20 that couple to LAN interface 42. In addition, when operating as a server, call management device 12 redirects calls from remotely managed telephone devices 20 to voicemail server 22 and relays message waiting indications to client devices 12. When acting as a client, call management device 12 redirects calls to server device 12 for voicemail service and relays message waiting indications received from server device 12 to managed telephony devices 20.

PSTN interface 40, LAN interface 42, and WAN interface 44 each represent hardware, including appropriate controlling logic, that links call management device 12, respectively, to PSTN 14, local area network 18, and wide area network 16. However, while illustrated as separate components providing direct links to each respective network, call management device 12 contemplates implementing these interfaces using any appropriate combination and arrangement of hardware and logic. For example, call management device 12 may link to wide area network 16 through equipment within local area network 18. Thus, call management device 12 may access wide area network 16 through LAN interface 42.

Controller 46 represents any suitable combination and arrangement of hardware and controlling logic, such as microprocessors, programmable logic devices, controllers, and other suitable controlling equipment. Memory 48 represents any suitable collection and arrangement of local and remote data storage devices providing a computer readable storage medium including the operating information used by controller 46. Thus for example, while illustrated as a component within call management device 12, memory 48 may represent an external storage device coupled to local area network 18, wide area network 16, or other suitable networks.

Therefore, memory 48 potentially represents a shared storage device accessible by one or more call management devices 12.

In the embodiment illustrated, memory 48 maintains local management information 50, remote subscriber information 52, and server device information 54. Local management information 50 includes data for use by call management device 12 in managing local telephony devices 20. For example, local management information 50 may include a table that associates telephone numbers to IP addresses for local telephony devices 20.

Remote subscriber information 52 includes data for use in relaying message waiting indications to client devices 12. Thus, when operating as a server, call management device 12 uses remote subscriber information 52 to identify client devices 12 associated with telephony devices 20. For example, remote subscriber information 52 may include a table that associates telephone numbers with IP addresses of controlling call management devices 12.

Server device information 54 includes data for identifying call management devices 12 that provide voicemail services. For example, server device information 54 may include IP addresses for call management devices 12 that couple to voicemail servers 22. When operating as a client, call management device 12 uses server device information 54 to identify a server to provide voicemail services for its managed telephony devices 20.

In operation, call management device 12 manages telephony services for local telephony devices 20. When operating as a server, call management device 12 links to voicemail server 22 and supports call redirection and relaying of message waiting indications to provide voicemail services to telephony devices 20 having distributed management. When operating as a client, call management device 12 uses registration and call redirection to provide voicemail services to local telephony devices 20 using a remote voicemail server 22 that links with a server call management device 12.

Upon receiving an incoming call for a locally managed telephony device 20, call management device 20 rings the appropriate extension. For example, call management device 12 may access local management information 50 to determine the IP address of telephony device 20 associated with the called digits of the received call. Using this information, call management device 12 communicates an appropriate signal to telephony device 20. If telephony device 20 fails to answer, call management device 12 determines the appropriate ring-no-answer (RNA) action. For example, local management information 50 may indicate a timeout period and appropriate action, such as transfer to voicemail, in the event of no answer. If the RNA action specifies transfer to voicemail, the operation of call management device 12 depends on whether functioning as a server or a client.

If functioning as a server, call management device 12 transfers the call to voicemail server 22. For example, call management device 12 may pulse dual tone multifrequency (DTMF) signals, generate call transfer packets, or communicate other suitable signals to voicemail server 22. The particular type of signals used by server device 12 will depend upon the type of voicemail server 22 in use.

If operating as a client, then upon identifying a call for transfer to voicemail, call management device 12 redirects the call to server device 12. For example, call management device 12 may access server device information 54 to determine the IP address of server device 12. Using this information, call management device 12 may redirect the call across wide area network 16 to server 12. Server 12 then performs the appropriate signaling to link the call with voicemail server 22.

When operating as a server, call management device 12 also handles relaying of message waiting indications received from voicemail server 22. From voicemail server 22, call management device 12 may receive message waiting indications for locally managed and remotely managed telephony devices 20. For locally managed telephony devices 20, call management device 12 instructs the appropriate telephony device 20 to provide a message waiting indication. However, upon receiving a message waiting indication for a remotely managed telephony device 20, call management device 12 relays the message waiting indication to the remote call management device 12 responsible for the telephony device 20.

For example, upon receiving a message waiting indication from voicemail server 22, call management device 12 may access local management information 50 to determine whether the message waiting indication identifies a locally managed telephony device 20. If so, call management device 12 communicates an appropriate signal to the local telephony device 20. However, if the identified telephony device 20 is not locally managed, call management device 12 accesses remote subscriber information 52 to identify the remote call management device 12 responsible for the identified telephony device 20. Call management device 12 then relays the message waiting indication to the identified remote call management device 12.

While the embodiment illustrated and the preceding description focus on a particular embodiment of call management device 12 that include specific elements, system 10 contemplates call management device 12 having any suitable combination and arrangement of elements for redirecting calls and relaying message waiting indications to enable centralized voicemail services in a distributed telephony environment. Thus, the modules and functionalities described may be combined, separated, or otherwise distributed among any suitable functional components, and some or all of the functionalities of call management device 12 may be performed by logic encoded in media, such as software and programmed logic devices.

Figure 3:
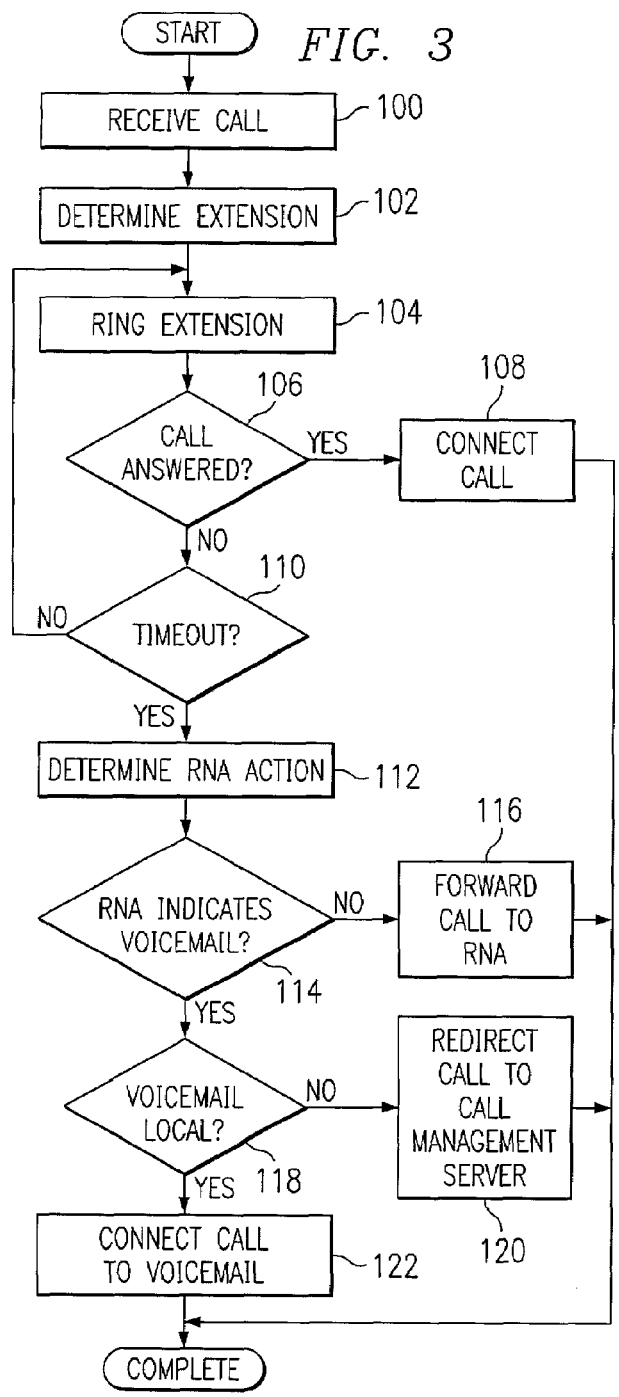
FIG. 3 is a flowchart illustrating a method for redirecting calls from a client call management device to a server call management device for service by a central voicemail system.

FIG. 3 is a flowchart illustrating a method for handling a received incoming call for a locally managed telephony device 20. Call management device 12 receives a call for a locally managed telephony device 20 at step 100. For example, using PSTN interface 40, LAN interface 42, or WAN interface 44, call management device 12 may receive a call destined for one of the locally managed telephony devices 20. Call management device 12 determines the appropriate extension at step 102. For example, call management device 12 may access local management information 50 to determine an IP address associated with the called digits of the call. Call management device 12 rings the identified extension at step 104. For example, call management device 12 may communicate an H.323 signal identifying the call to telephony device 20.

If call management device 12 determines that the call has been answered at step 106, call management device 12 connects the call to telephony device 20 at step 108. For example, using appropriate signaling, telephony device 20 may communicate an off-hook indication to call management device 12, and in response, call management device 12 may open the voice channel to telephony device 20. If the call is not answered, call management device 12 determines whether the call has timed out at step 110. For example, local management information 50 may identify a duration to wait for an off-hook indication from telephony device 20.

When the ringing times out, call management device 12 determines the RNA action for telephony device 20 at step 112. For example, call management device 12 may access local management information 50 to determine an action, such as a forwarding number or voicemail, indicated for telephony device 20. If call management device 12 determines that the RNA action does not indicate voicemail at step 114, call management device 12 forwards the call to the indicated RNA number at step 116. However, if the RNA action indicates voicemail, call management device 12 determines whether voicemail is handled locally at step 118. If acting as a client, voicemail is not local but if acting as a server, voicemail is local. If voicemail is not local, call management device 12 redirects the call to the call management server at step 120. For example, call management device 12 may access server device information 54 to determine the server call management device 12 that provides voicemail services using voicemail server 22. Call management device 12 may then redirect the call across wide area network 16, for example, using an H.323 redirect message, to server device 12. However, if the voicemail is locally serviced, call management device 12 connects the call to voicemail server 22 at step 122.

Thus the flowchart and preceding description outline the operation of call management device 12 in handling an incoming call whether operating as a server or a client. However, the flowchart and accompanying description illustrate only an exemplary method of operation, and system 10 contemplates call management devices 12 using any suitable techniques and elements for operating as a server or client to support centralized voicemail services in a distributed call management environment. Thus, many of the steps in this flowchart may take place simultaneously and/or in different orders than as shown. In addition, call management device 12 may use methods with additional steps, fewer steps, and/or different steps, so long as the methods remain appropriate.

Figure 4:
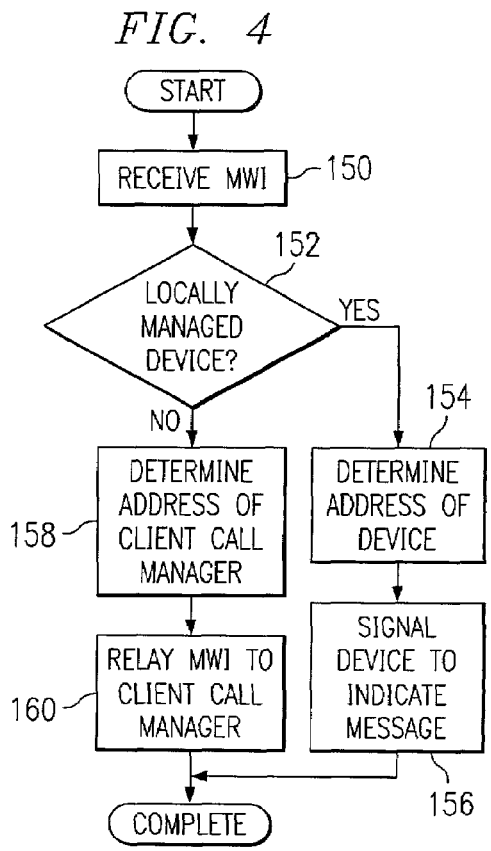
FIG. 4 is a flowchart illustrating a method for processing local and remote message waiting indications.

FIG. 4 is a flowchart illustrating a method for call management device 12 to handle a received message waiting indication. Call management device 12 receives a message waiting indication at step 150. For example, when operating as a server, call management device 12 may receive the message waiting indication from voicemail server 22. When operating as a client, call management device 12 may receive the message waiting indication relayed from server device 12.

Call management device 12 determines whether the call waiting indication identifies a locally managed telephony device 20 at step 152. For example, call management device 12 may access local management information 50 to determine whether the extension identified by the message waiting indication indicates a locally managed telephony device 20. If so, call management device 12 determines the address of telephony device 20 at step 154 and signals telephony device 20 to indicate a waiting message at step 156. For example, as previously discussed, call management device 12 may determine an IP address for telephony device 20 from local management information 50 and communicate appropriate signaling messages to telephony device 20 to notify of a message waiting in voicemail.

If call management device 12 determines that the message waiting indication identifies a remotely managed telephony device 20, call management device 12 determines the address of the appropriate client call manager at step 158 and relays the message waiting indication to the client call manager at step 160. For example, call management device 12 may access remote subscriber information 52 to determine the IP address of client call management device 12 associated with telephony device 20 identified in the message waiting indication. To relay the message waiting indication, call management device 12 may modify and/or format the information in the message waiting indication from voicemail server 22 into any suitable form. For example, call management device 12 may use SIP notifications that incorporate the information from the message waiting indication received from voicemail server 22. Call management device 12 may then communicate these notifications across wide area network 16 to the client call management device 12. However, as previously discussed, system 10 contemplates call management devices 12 using any suitable protocols and techniques for relaying message waiting indications from voicemail server 22 to client call management device 12.

The preceding description and flowchart illustrate an exemplary method for call management device 12 to handle received message waiting indications. However, as with the earlier described flowchart, this flowchart illustrates only an exemplary method of operation. Thus, many of the steps in this flowchart may take place simultaneously and/or in different orders than as shown. In addition, call management device 12 may use methods with additional steps, fewer steps, and/or different steps, so long as the methods remain appropriate. For example, when operating as a client, call management device 12 need not determine whether received message waiting indications identify a locally managed telephony device 20, since the client need not distinguish between locally or remotely managed telephony devices 20.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for supporting centralized voicemail services in a distributed telephony system, the method comprising:
    receiving at a local call management device a registration message from a remote call management device, the registration message identifying a number for a telephony device managed by the remote call management device and an address for the remote call management device;
    storing at the local call management device an association between the number for the telephony device managed by the remote call management device and the address for the remote call management device in response to the registration message;
    receiving at the local call management device a call redirected by the remote call management device, the local call management device operable to couple the call to a voicemail server, the local call management device providing an interface to the voicemail server for the remote call management device;
    receiving at the local call management device a message waiting indication from the voicemail server, the message waiting indication identifying a telephony device;
    determining, at the local call management device, whether the local call management device manages the telephony device identified by the message waiting indication; and
    if the local call management device does not manage the telephony device identified by the message waiting indication, determining the remote call management device managing the telephony device identified by the message waiting indication according to the association and relaying the message waiting indication to the remote call management device.

2. The method of claim 1, wherein the registration message uses session initiation protocol (SIP) event subscription.

3. The method of claim 1, further comprising, prior to receiving the message waiting indication, receiving a call redirect request at the local call management device from the remote call management device, the call redirect request identifying a call to the telephony device managed by the remote call management device.

4. The method of claim 1, further comprising, if the telephony device is locally managed:
determining an internet protocol (IP) address for the telephony device; and
communicating a message waiting signal to the telephony device using the IP address.

5. The method of claim 1, wherein relaying the message waiting indication comprises generating a session initiation protocol (SIP) notification identifying the telephony device and communicating the SIP notification to the call management device.

6. The method of claim 1, wherein determining the remote call management device managing the telephony device comprises accessing a memory mapping digits assigned to the telephony device to an internet protocol (IP) address assigned to the call management device.

7. The method of claim 1, wherein storing the association between the telephony device and the address for the remote call management device comprises storing the association in the local call management device.

8. A call management device comprising:
a wide area network (WAN) interface operable to receive a registration message from a remote call management device, the registration message identifying a number for a telephony device managed by the remote call management device and an address for the remote call management device;
a memory operable to store an association between the number for the telephony device managed by the remote call management device and the address of the remote call management device in response to the registration message; and
a controller operable to:
receive a call redirected by the remote call management device;
couple the call to a voicemail server, the call management device providing an interface to the voicemail server for the remote call management device;
receive a message waiting indication from a voicemail server, the message waiting indication identifying a telephony device;
determine whether the telephony device identified by the message waiting indication is locally managed;
if the telephony device identified by the message waiting indication is not locally managed, determine the remote call management device managing the telephony device identified by the message waiting indication according to the association and relay the message waiting indication to the remote call management device.

9. The call management device of claim 8, wherein the registration message uses session initiation protocol (SIP) event subscription.

10. The call management device of claim 8, wherein the controller is further operable, prior to receiving the message waiting indication, to receive a call redirect request at the local call management device from the remote call management device, the call redirect request identifying a call to the telephony device managed by the remote call management device.

11. The call management device of claim 8, wherein:
the controller is further operable, if the telephony device is locally managed, to determine an internet protocol (IP) address for the telephony device; and
the call management device further comprising a local area network (LAN) interface operable to communicate a message waiting signal to the telephony device using the IP address.

12. The call management device of claim 8, wherein the controller is further operable to relay the message waiting indication by generating a session initiation protocol (SIP) notification identifying the telephony device and communicating the SIP notification to the call management device.

13. The call management device of claim 8, further comprising a memory mapping digits assigned to the telephony device to an internet protocol (IP) address assigned to the remote call management device, and wherein the controller is further operable to determine the remote call management device managing the telephony device by accessing the memory.

14. A computer readable storage medium including code for supporting centralized voicemail services in a distributed telephony system, the code operable when executed to:
receive at a local call management device a registration message from a remote call management device, the registration message identifying a number for a telephony device managed by the remote call management device and an address for the remote call management device;
store at the local call management device an association between the number for the telephony device managed by the remote call management device and the address for the remote call management device in response to the registration message;
receive at the local call management device a call redirected from the remote call management device, the local call management device operable to couple the call to a voicemail server, the local call management device providing an interface to the voicemail server for the remote call management device;
receive at the local call management device a message waiting indication from the voicemail server, the message waiting indication identifying a telephony device;
determine, at the local call management device, whether the local call management device manages the telephony device identified by the message waiting indication; and
if the local call management device does not manage the telephony device identified by the message waiting indication, determine the remote call management device managing the telephony device identified by the message waiting indication according to the association and relay the message waiting indication to the remote call management device.

15. The computer readable storage medium of claim 14, wherein the registration message uses session initiation protocol (SIP) event subscription.

16. The computer readable storage medium of claim 14, the code further operable, prior to receiving the message waiting indication, to receive a call redirect request at the local call management device from the remote call management device, the call redirect request identifying a call to the telephony device managed by the remote call management device.

17. The computer readable storage medium of claim 14, the code further operable, if the telephony device is locally managed, to:
- determine an internet protocol (IP) address for the telephony device; and
- communicate a message waiting signal to the telephony device using the IP address.

18. The computer readable storage medium of claim, 14, the code further operable to relay the message waiting indication by generating a session initiation protocol (SIP) notification identifying the telephony device and communicating the SIP notification to the call management device.

19. The computer readable storage medium of claim 14, the code further operable to determine the remote call management device managing the telephony device by accessing a memory mapping digits assigned to the telephony device to an internet protocol (IP) address assigned to the call management device.

20. A call management device comprising:
- means for receiving at a local call management device a registration message from a remote call management device, the registration message identifying a number for a telephony device managed by the remote call management device and an address for the remote call management device;
- means for storing at the local call management device an association between the number for the telephony device managed by the remote call management device and the address for the remote call management device in response to the registration message;
- means for receiving at the local call management device a call redirected by the remote call management device, the local call management device operable to couple the call to a voicemail server, the local call management device providing an interface to the voicemail server for the remote call management device;
- means for receiving at the local call management device a message waiting indication from the voicemail server, the message waiting indication identifying a telephony device;
- means for determining, at the local call management device, whether the local call management device manages the telephony device identified by the message waiting indication; and
- means for, if the local call management device does not manage the telephony device identified by the message waiting indication, determining the remote call management device managing the telephony device identified by the message waiting indication according to the association and relaying the message waiting indication to the remote call management device.

21. A method for supporting centralized voicemail services in a distributed telephony system, the method comprising:
- receiving at a local call management device a registration message from a remote call management device, the registration message identifying a number for a telephony device managed by the remote call management device and an address for the call management device;
- storing at the local call management device an association between the number for the telephony device managed by the remote call management device and the address for the call management device in response to the registration message;
- receiving at the local call management device a call redirect request from the call management device, the call redirect request identifying a call from a remote device to the telephony device;
- receiving at the local call management device a call redirected by the remote call management device, the local call management device operable to couple the call to a voicemail server, the local call management device providing an interface to the voicemail server for the remote call management device;
- redirecting the call at the local call management device to the voicemail server;
- receiving at the local call management device a message waiting indication from the voicemail server, the message waiting indication identifying the telephony device;
- accessing the memory at the local call management device to identify the association and to determine the address of the remote call management device; and
- relaying the message waiting indication at the local call management device to the remote call management device.

* * * * *

UNITED STATES PATENT AND TRADEMARK OFFICE
CERTIFICATE OF CORRECTION

| | |
|---|---|
| PATENT NO. | : 7,640,326 B2 |
| APPLICATION NO. | : 10/116621 |
| DATED | : December 29, 2009 |
| INVENTOR(S) | : Sharma et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1149 days.

Signed and Sealed this

Ninth Day of November, 2010

David J. Kappos
*Director of the United States Patent and Trademark Office*